Sept. 15, 1942.  C. E. TACK  2,295,875
ROTOR BRAKE
Filed Sept. 23, 1940  3 Sheets-Sheet 1
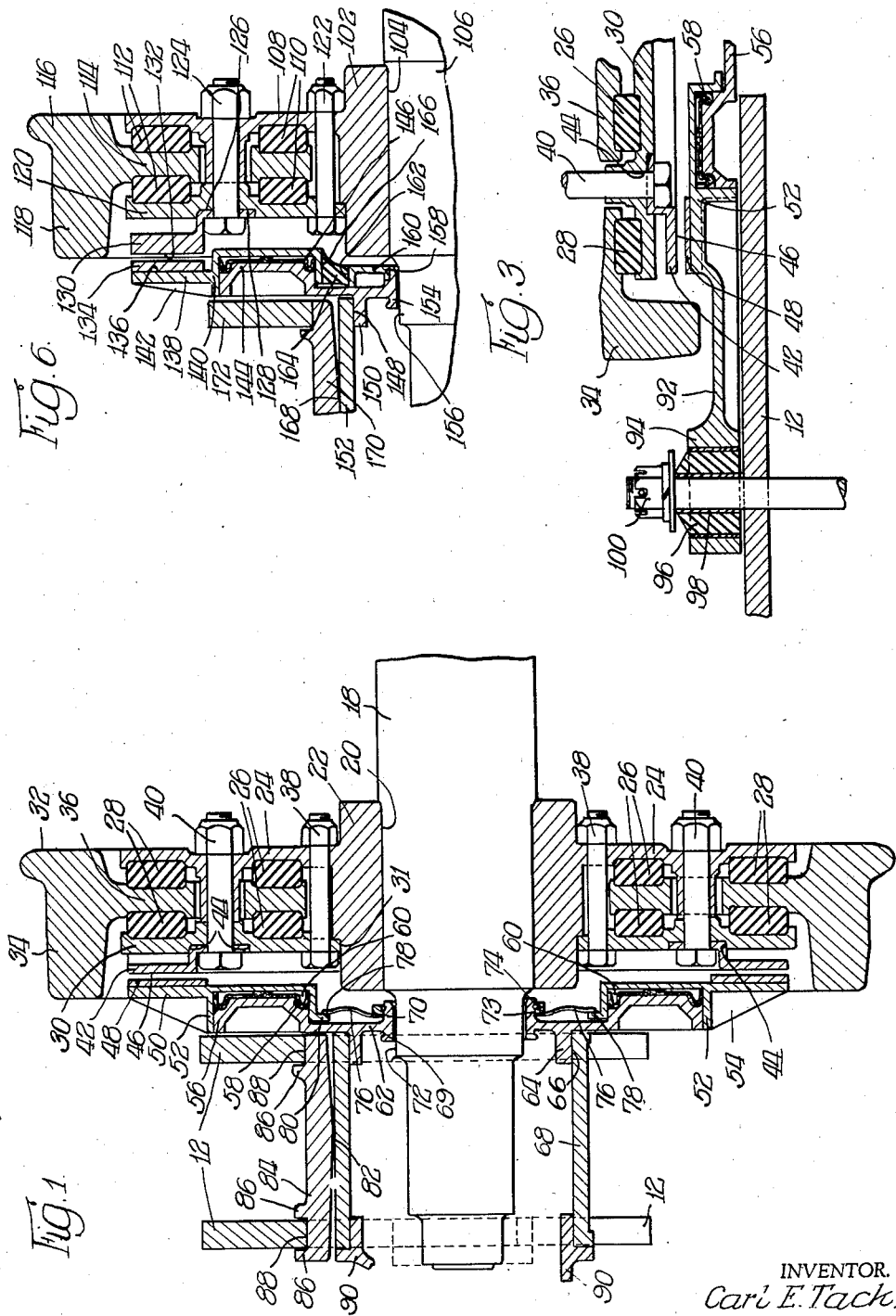
INVENTOR.
Carl E. Tack,
BY
Atty.

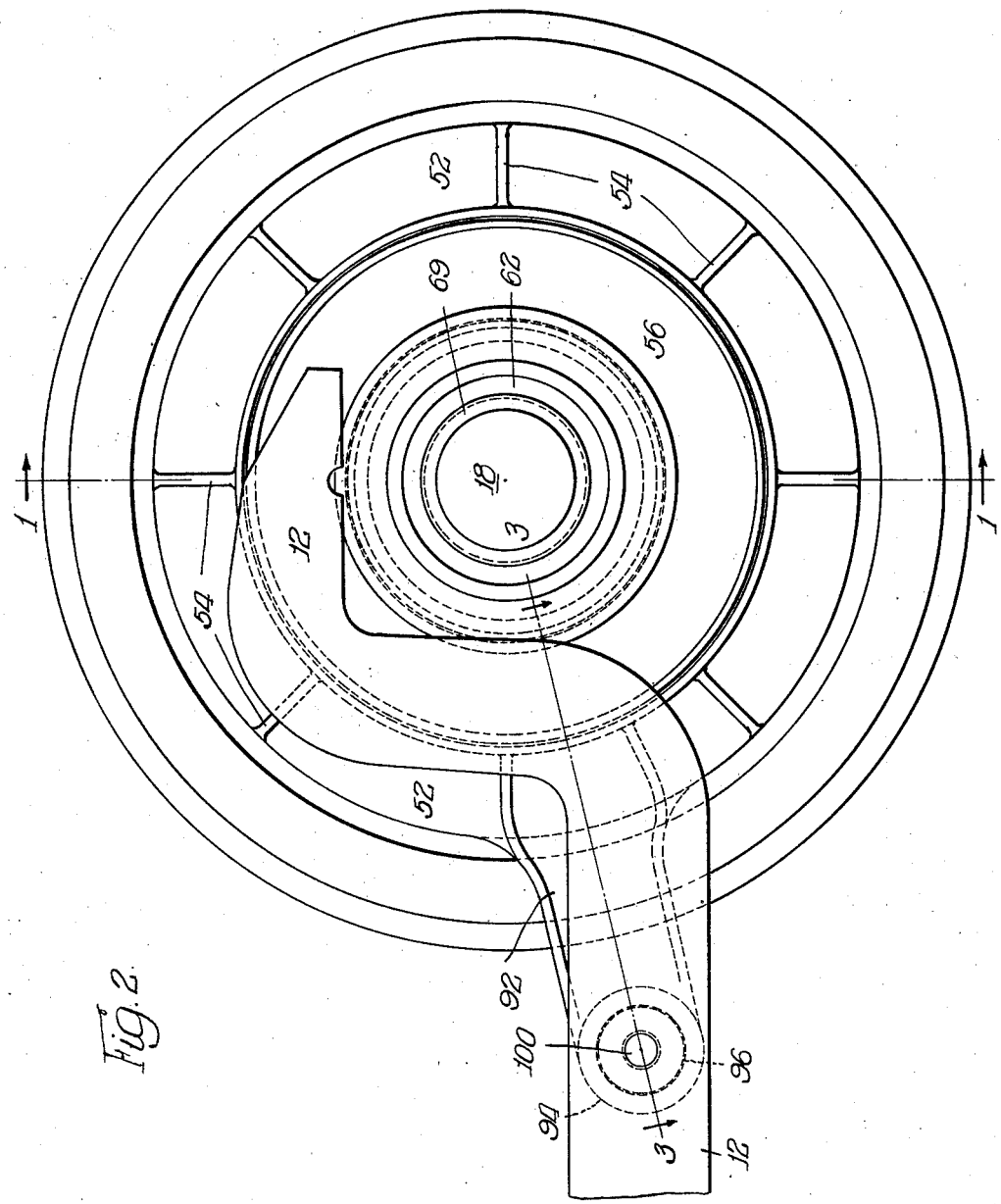

Sept. 15, 1942.　　　　C. E. TACK　　　　2,295,875
ROTOR BRAKE
Filed Sept. 23, 1940　　　　3 Sheets-Sheet 3
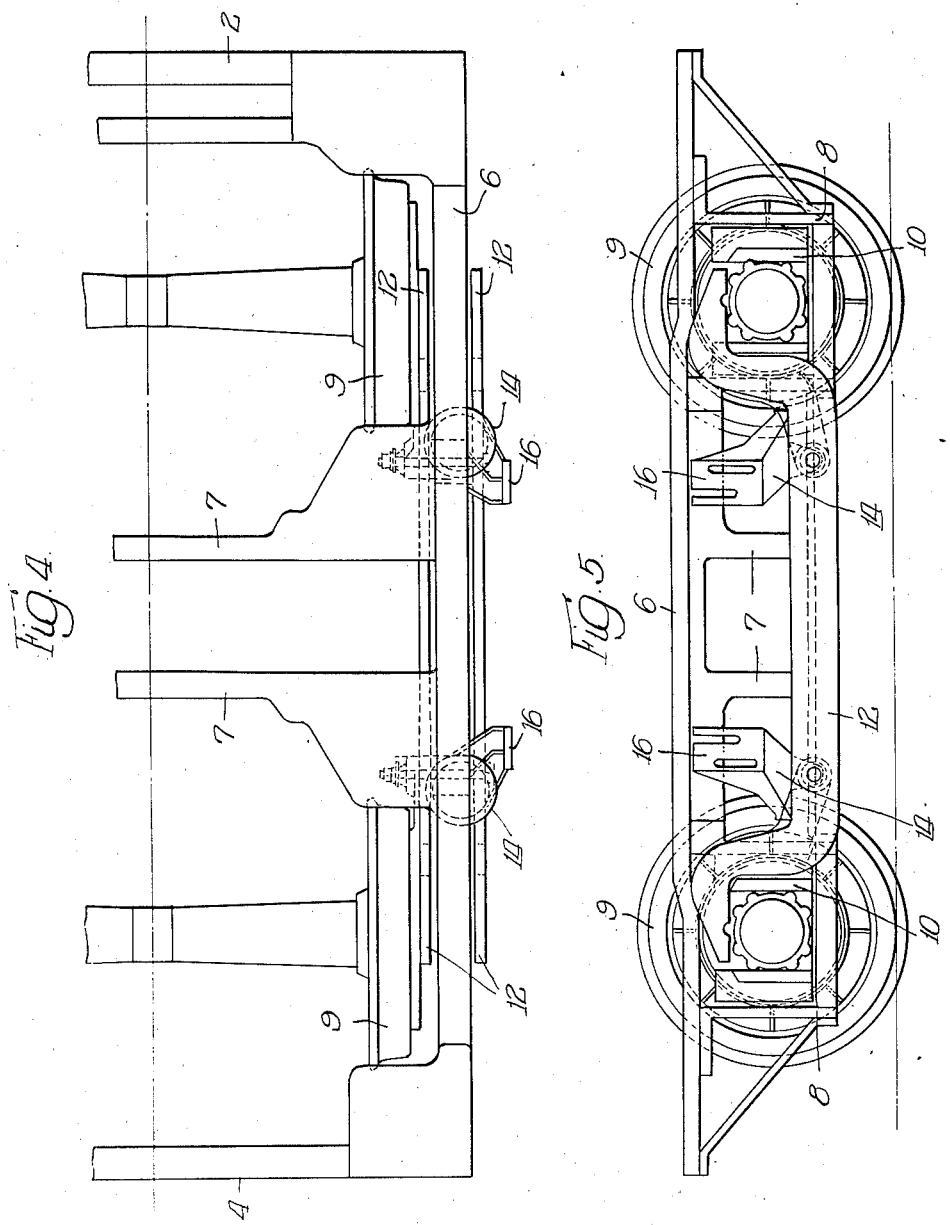
INVENTOR.
Carl E. Tack, Patented Sept. 15, 1942

2,295,875

UNITED STATES PATENT OFFICE 2,295,875

ROTOR BRAKE

Carl E. Tack, Chicago, Ill., assignor to American Steel Foundries, Chicago, Ill., a corporation of New Jersey Application September 23, 1940, Serial No. 357,842

24 Claims. (Cl. 188—153)

My invention relates to braking means for a railway car truck, and more particularly to a form of such brake, commonly designated a rotor brake, wherein braking means are associated with the wheel and axle assembly in such manner as to secure braking on areas other than the tread surface of the wheels.

An object of my invention is to devise such a brake arrangement for a railway car truck, which will be particularly suitable for application to trucks commonly used on high speed subway cars wherein frequent stops are required and a highly efficient form of braking control is made necessary because of such frequent stops, and the need for a high rate of deceleration.

Another object of my invention is to devise a form of rotor brake particularly suitable for application to a railway wheel and axle assembly utilizing a known form of resilient wheel, wherein metal to metal contact is avoided between the tread portion of the wheel and the hub portion thereof, in order to reduce noise and facilitate easy riding.

My invention comprehends such an arrangement as that described, wherein a ring type cylinder may be utilized, said cylinder being positioned around the axle and having formed as a part thereof, means for carrying a surface to be braked against an opposing braking surface supported on the wheel.

In my novel arrangement, the ring piston associated with the ring cylinder is fixed with respect to the journal box within which the axle rotates, and when the brakes are applied, the cylinder is the moving part instead of the piston, as is more commonly the case. In other words, my invention contemplates a rotor brake wherein a ring cylinder is movably associated with a fixed piston to operate the braking means.

My invention comprehends such an arrangement as that described, wherein the movable ring cylinder may be in one modification slidably supported from the fixed piston, and in another modification, resiliently supported therefrom for normal engagement therewith.

Figure 1 is a sectional view through one end of a wheel and axle assembly, showing one modification of my invention, the section being taken substantially in the transverse vertical plane bisecting the wheel and axle assembly, as indicated by the line 1—1 of Figure 2.

Figure 2 is an end elevation of the wheel and axle assembly shown in Figure 1, showing also a fragmentary portion of an associated car truck.

Figure 3 is a fragmentary sectional view, taken in a radial plane through the torque arm associated with the brake substantially as indicated by the line 3—3 of Figure 2.

Figure 4 is a top plan view of a railway car truck embodying my invention, only one-half the truck structure being shown inasmuch as the arrangement is similar at opposite sides of the truck.

Figure 5 is a side elevation of the truck and brake structure shown in Figure 4.

Figure 6 is a fragmentary view, comparable to that of Figure 1, showing a sectional view through a brake arrangement generally similar to that of the previous modification but differing therefrom in the manner in which the brake cylinder is mounted.

Describing the structure in greater detail, and in referring first to the general truck and brake arrangement as shown in Figures 4 and 5, the truck frame comprises the end rails 2 and 4 and the side member 6, together with spaced transoms 7, 7 between which may be supported a bolster (not shown). The said side member may have the usual pedestal means 8, 8 at opposite ends of the truck for reception of roller bearing journal boxes, generally designated 10, 10 forming the usual means of connection with spaced wheel and axle assemblies 9, 9. On said boxes 10, 10 may be seated the opposite ends of the paired inboard and outboard equalizers 12, 12, and on said equalizers may be supported the spaced spring seats 14, 14 within which may be carried spring groups (not shown) and on said spring groups may be seated at spaced points the top members of the side frame. Integrally formed with the spring seats 14, 14 are the brackets 16, 16 serving as means for adjustably supporting the carrier beam for third rail shoes.

Detail of a single wheel and axle assembly is shown in Figures 1 to 3 inclusive, wherein it may be noted that the said assembly is of roller bearing type comprising the axle 18 upon which may be press fitted as at 20, the wheel hub 22, said hub having integral therewith a plate portion 24 formed on its outboard face with two annular series of recesses within which may be seated rubber pads 26, 26 of the inner series, and 28, 28 of the outer series. The plate 24 is formed with two annular series of openings which may be aligned with similar series of openings in the outboard face plate or disk 30, the inboard face of which is likewise afforded recesses oppositely placed with respect to the recesses in the plate 24 likewise for reception of the outboard series of rubber pads 26, 26 and 28, 28, similar in design and arrangement to those already mentioned. Clamped between the inboard and outboard series of rubber pads is the wheel member generally designated 32 comprising the tread portion 34 and the plate portion 36. On the opposite faces of the plate portion 36 are formed likewise two series of recesses within which may be seated said inner and outer series of rubber blocks 26 and 28 so that the two inboard series of said rubber blocks are in compression between the hub plate 24 and the wheel plate 36 and the two outboard series of rubber pads 26 and 28 are likewise in compression between the wheel plate 36 and the outboard face plate 30 which may be press fitted as at 31 on the outboard portion of the wheel hub. Securing bolts for retaining these parts in assembled relationship are provided in an inner annular series 38, 38 and an outer annular series 40, 40 and the said bolts may be drawn up to afford the proper degree of compression for said rubber pads to give the desired amount of rigidity to the wheel assembly.

The outer series of retaining bolts 40, 40 serve also as securing means for the rotor disk 42 which may be recessed as at 44 within the face plate 30, said rotor having a braking surface as at 46 for engagement with the brake pad or wear plate 48 secured on the annular flange 50 integrally formed with the cylinder 52, said flange being reinforced by a series of radial ribs 54, 54. As already indicated the ring type cylinder 50 is slidably positioned over the fixed ring piston 56 and between said piston and cylinder is positioned the annular packing ring 58. Into the space 60 between the packing ring 58 and the cylinder 52 compressed air may be forced by means (not shown) for actuation of the brakes.

The piston casting 56 comprises at its inner portion the radial flange 62 on which may be formed the outboard annular flange 64 which may be press fitted as at 66 into the roller bearing journal box 68 as a means of fixing the position of said piston casting. On the radially inner periphery of the radial flange 62 is formed an outboard annular flange 69 continuous with an inboard annular flange 70, said flanges 69, 70 being but slightly spaced from the adjacent shoulder 72 of the axle 18 in order to accommodate rotation therewithin of said axle. On the inboard annular flange 70 of the piston casting 56 may be press fitted as at 73 the spring assembly 74 of ring-like form with a series of projecting spring fingers 76, 76 whose tips may bear as at 78, 78 against the inner flange 80 of the cylinder casting 52, thus affording means of restoring said cylinder to its normal position after the brakes are released.

Atop the journal box 68 may be seated as at 82 the convex base of the bearer 84, said bearer being flanged as at 86, 86 to position the equalizers 12, 12 seated thereon as at 88, 88. The journal box 68 has closure means fragmentarily shown at 90, 90.

Integrally formed with the cylinder casting 52 is the torque arm 92 and on the extremity of said torque arm may be formed a hub portion 94 within which may be pressed the bushed resilient member 96 which is seated as at 98 on the securing bolt 100 and said securing bolt may extend through the equalizers 12, 12 and be secured thereto. It will be readily understood by those skilled in the art that the pad 96 will be placed in shear upon actuation of the cylinder 52 and that said pad will act as additional release means for said cylinder.

The modification shown in Figure 6 is generally similar to that just described but differs therefrom in the manner in which the cylinder is supported from the piston casting. In the modification now under consideration (Figure 6) the wheel hub 102 is press fitted as at 104 on the axle 106. Integrally formed with the wheel hub 102 is the plate portion 108, presenting on its outboard face an inner and an outer annular series of recesses in which may be seated the resilient pads or rubber blocks designated 110, 110 for the inner series and 112, 112 for the outer series. The outboard faces of inboard blocks 110, 110 and 112, 112 are seated in opposed recesses formed on the plate portion 114 of the wheel 116, said wheel comprising the tread portion 118. On the opposite face of the plate portion 114 are formed likewise, an inner and an outer series of recesses in which may be seated also the outboard rubber pads or blocks 110, 110 and 112, 112 whose opposite faces are received in similar recesses formed on the inboard side of the face plate 120. The wheel hub 102 of the wheel portion 116 together with the face plate 120 and the resilient pads or rubber blocks 110, 112 are retained in assembly by an inner annular series of securing bolts 122, 122 and an outer annular series of securing bolts 124, 124. Said bolts may be adjusted to a tension sufficient to secure the desired rigidity of the structure as a whole.

On the outboard face of the plate 120 is formed a slight annular recess within which may be seated as at 126 the annular flange 128 forming a portion of the rotor disk 130, said rotor disk being secured in such position by the beforementioned series of bolts 124, 124. On the outboard face of the rotor disk 130 is formed a braking surface 132 for engagement with the annular wear plate or braking pad 134 secured on the inboard face as at 136 on the annular flange 138 of the ring cylinder casting generally designated 140. The annular flange 138 is reinforced by a series of spaced ribs 142, 142. The cylinder casting 140 has slidable relationship in the usual manner with the ring piston 144 and a gasket or sealing ring is provided at 146. As in the previous modification, the ring piston 144 is fixed in position by a press fit as at 148 of the integrally formed outboard annular flange 150 within the roller bearing journal box 152. The piston casting 144 comprises also a sleeve-like central portion 154 which surrounds and has a close fit, but some clearance around the shoulder 156 formed on the axle 106.

The sleeve portion 154 of the piston casting serves as a carrier for the cylinder casting. On the inboard end of the sleeve portion 154 may be press fitted as at 158 the carrier ring 160, on the outer annular surface of which may be vulcanized as at 162 the resilient ring 164, and the outer annular face of said resilient ring may be vulcanized as at 166 to the inner annular face of the cylinder casting 140. By this means the cylinder casting is held in normal position with respect to the piston and yet a degree of resilience is afforded to accommodate slight changes in position of said ring piston due to wear or other conditions affecting the roller bearing journal box within which the ring piston casting is carried as already described.

In this modification, the journal box 152 affords a seat as at 168 for the bearer 170 at each side of which may be supported an equalizer 172 as in the previous modification.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a brake arrangement for a railway car truck, a frame, spaced supporting wheel and axle assemblies and braking means for each wheel comprising a rotor supported on the outboard face of the wheel, a journal box carried on the end of the adjacent axle, a ring piston fixed on the inboard face of said box and comprising a sleeve surrounding said axle, a resilient member supported from said sleeve, a ring cylinder carried on said resilient member for slidable relationship with said piston, a stator mounted on said cylinder for engagement with said rotor, said resilient member operating as release means for said cylinder after actuation of said brake, and a torque arm on said cylinder connected to said frame.

2. In a brake arrangement, a railway car truck comprising a frame, spaced supporting wheel and axle assemblies having journal ends, journal boxes mounted on said journal ends, and braking means for each wheel comprising a rotor fixed to the wheel, a ring piston casting having an annular flange press fitted into the adjacent box with a sleeve surrounding the adjacent axle, a ring cylinder resiliently mounted for movement on said piston, and a stator fixed on said cylinder for engagement with said rotor, said resilient mounting comprising a resilient ring fitted between said sleeve and said ring cylinder.

3. In a brake arrangement, a railway car truck comprising a frame, spaced supporting wheel and axle assemblies having journal ends, equalizers extending between said journal ends at each side of the truck, journal boxes mounted on said journal ends, and braking means for each wheel comprising a rotor fixed to the wheel, a ring piston casting having a press fit with the adjacent box and a sleeve surrounding the adjacent axle, a ring cylinder resiliently mounted for movement on said piston, a stator fixed on said cylinder for engagement with said rotor, and a torque arm connected between said cylinder and an equalizer.

4. In a brake arrangement for a railway car truck, a frame, spaced supporting wheel and axle assemblies and braking means for each wheel comprising a rotor supported on the outboard face of the wheel, a journal box carried on the end of the adjacent axle, a ring piston fixed on the inboard face of said box and comprising a sleeve surrounding said axle, a resilient member supported from said sleeve, a ring cylinder carried on said resilient member for slidable relationship with said piston, a stator mounted on said cylinder for engagement with said rotor, and a torque arm on said cylinder connected to said frame.

5. In a brake arrangement for a railway car truck, a frame, spaced supporting wheel and axle assemblies and braking means for each wheel comprising a rotor supported on the outboard face of the wheel, a journal box carried on the end of the adjacent axle, a ring piston fixed on the inboard face of said box and comprising a sleeve surrounding said axle, a resilient member supported from said sleeve, a ring cylinder carried on said resilient member for slidable relationship with said piston, and a stator mounted on said cylinder for engagement with said rotor, said resilient member operating as release means for said cylinder after actuation of said brake.

6. In a brake arrangement for a railway car truck, a truck frame, spaced supporting wheel and axle assemblies and braking means for each wheel comprising a rotor secured on the outboard face of the wheel, a journal box mounted on the end of the adjacent axle, a ring piston casting having an annular flange press fitted within said box and a sleeve portion surrounding said axle, a ring cylinder movably mounted on the piston, said cylinder comprising an annular radial flange, and stator brake means mounted on said annular flange for engagement with said rotor.

7. In a brake arrangement for a railway car truck, a frame, spaced supporting wheel and axle assemblies, and braking means for each wheel comprising a rotor supported on the outboard face of the wheel, a journal box carried on the end of the adjacent axle, a ring piston fixed on the inboard face of said box and comprising a sleeve surrounding said axle, a resilient member supported from said sleeve, a ring cylinder carried on said resilient member for slidable relationship with said piston, and a stator mounted on said cylinder for engagement with said rotor.

8. In a brake arrangement for a railway car truck, a truck frame, spaced supporting wheel and axle assemblies, and braking means for each wheel comprising a rotor secured to the outboard face of the wheel, a journal box supported on the journal end of the adjacent axle, a ring piston fixed on the inboard side of said box, a ring cylinder slidably mounted on said ring piston and comprising a circumferential radial flange, a brake stator mounted on said flange opposite said rotor for engagement therewith, and release means mounted on said ring piston for restoring said cylinder to normal position after actuation of said brakes, said release means comprising a resilient member mounted on said piston and encircling said axle.

9. In a railway car truck, a frame comprising a side member, spaced supporting wheel and axle assemblies having journal ends, journal boxes supported on said journal ends, and braking means for each wheel comprising a rotor on the outboard face of the wheel, a ring piston fixed on the inboard face of the adjacent box, a ring cylinder slidably mounted with respect to said piston, a stator secured to said cylinder for engagement with said rotor and release means for said cylinder comprising an annular resilient pad mounted on said piston and vulcanized to said cylinder.

10. In a brake arrangement, a railway car truck comprising a frame, spaced supporting wheel and axle assemblies having journal ends, journal boxes mounted on said journal ends, and braking means for each wheel comprising a rotor fixed to the wheel, a ring piston casting having an annular flange press fitted into the adjacent box and a sleeve surrounding the adjacent axle, a ring cylinder resiliently mounted for movement on said piston, and a stator fixed on said cylinder for engagement with said rotor.

11. In a railway car truck, a frame comprising a side member, spaced supporting wheel and axle assemblies having journal ends, journal boxes supported on said journal ends, and braking means for each wheel comprising a rotor on the outboard face of the wheel, a ring piston fixed on the inboard face of the adjacent box, a ring cylinder slidably mounted with respect to said piston, a stator secured about the outer periphery of said cylinder for engagement with said rotor, and resilient means carried on said piston for release of said cylinder after actuation of said brakes, said resilient means comprising a ring member vulcanized between said piston and said cylinder.

12. In a rotor brake arrangement for a railway car truck, a frame, a supporting wheel and axle assembly comprising a wheel and an axle having a journal end, a journal box thereon, a rotor secured to said wheel, a ring piston fixed on said box, a ring cylinder slidably mounted over said piston, a radial flange on said cylinder opposite said rotor, stator means fixed on said flange for engagement with said rotor, and resilient release means connected between said cylinder and said piston for release of said cylinder after actuation thereof, said release means comprising a ring-like resilient member encircling said axle between a portion of said piston and the inner periphery of said cylinder.

13. In a railway car truck, a frame comprising a side member, spaced supporting wheel and axle assemblies having journal ends, journal boxes supported on said journal ends, and braking means for each wheel comprising a rotor secured on the wheel, a piston fixed on the inboard side of the adjacent box, a cylinder slidably mounted on said piston, a stator fixed to said cylinder for engagement with said rotor, and a torque arm integrally formed with said cylinder and having a resilient connection at its remote end to said frame, said connection comprising a resilient pad formed and arranged to be placed in shear upon actuation of said cylinder.

14. In a brake arrangement for a railway car truck, a truck frame, spaced supporting wheel and axle assemblies, and braking means for each wheel comprising a rotor secured to the outboard face of the wheel, a journal box supported on the journal end of the adjacent axle, a ring piston fixed on the inboard side of said box, a ring cylinder slidably mounted on said ring piston and comprising an outer radial flange, a brake stator mounted on said flange opposite said rotor for engagement therewith, and a torque arm on said cylinder having an end remote from said cylinder resiliently connected to said frame, said connection comprising an opening in said arm, a resilient pad mounted therein and having an opening therethrough, and a rigid member received within said last-mentioned opening and secured to said frame.

15. In a railway car truck, a frame comprising a side member, spaced supporting wheel and axle assemblies having journal ends, journal boxes supported on said journal ends, and braking means for each wheel comprising a rotor on the outboard face of the wheel, a ring piston fixed on the inboard face of the adjacent box, a ring cylinder slidably mounted with respect to said piston, a stator secured to said cylinder for engagement with said rotor, and resilient release means vulcanized between said cylinder and said piston.

16. In a brake arrangement for a railway car truck, a truck frame, spaced supporting wheel and axle assemblies, and braking means for each wheel comprising a rotor secured to the outboard face of the wheel, a journal box supported on the journal end of the adjacent axle, a ring piston fixed on the inboard side of said box, a ring cylinder movably mounted on said piston, and a brake stator integrally formed with said movable cylinder, said stator comprising a circumferential flange formed about the outer periphery of said cylinder and a plurality of radial ribs integral with said flange and said cylinder.

17. In a rotor brake arrangement for a railway car truck, a frame, a supporting wheel and axle assembly having a journal end, a journal box thereon, a rotor secured to said wheel, a ring piston fixed on said box, a ring cylinder slidably mounted over said piston, a circumferential radial flange on said cylinder opposite said rotor, stator means fixed on said flange for engagement with said rotor, and release means vulcanized between said cylinder and said piston.

18. In a rotor brake arrangement for a railway car truck, a frame, a supporting wheel and axle assembly having a journal end, a journal box thereon, a rotor secured to said wheel, a ring piston fixed on said box, a movable ring cylinder mounted on said piston, a stator secured on said cylinder opposite said rotor for engagement therewith, and release means for said brake arrangement comprising a ring-like member fixed on said piston around said axle, said ring-like member having its outer periphery in engagement with the inner periphery of said cylinder for movement thereof.

19. In a railway car truck, a frame comprising a side member, spaced supporting wheel and axle assemblies having journal ends, journal boxes supported on said journal ends, and braking means for each wheel comprising a rotor secured on the wheel, a piston fixed on the inboard side of the adjacent box, a cylinder slidably mounted on said piston, a stator fixed to said cylinder for engagement with said rotor, and a release member for said braking means, said release member having its outer periphery abutting the inner periphery of said cylinder and its inner periphery supported from said piston.

20. In a rotor brake assembly, a fixed ring type piston having an annular flange, a movable ring type cylinder slidably mounted on said piston, and an annular pad of resilient material secured between said piston and cylinder and operative to release said cylinder after actuation thereof.

21. In a rotor brake arrangement for a railway car truck, a frame, a supporting wheel and axle assembly having a journal end, a journal box thereon, a rotor secured to said wheel, a piston fixed on said box and having a portion sleeved over said axle, a cylinder encircling said axle in slidable engagement with said piston, and a stator supported about the outer periphery of said cylinder for engagement with said rotor.

22. In a rotor brake arrangement for a railway car truck, a frame, a supporting wheel and axle assembly having a journal end, a journal box thereon, a rotor secured to said wheel, a piston fixed on said box and having a portion sleeved over said axle, a cylinder encircling said axle in slidable engagement with said piston, a stator supported about the outer periphery of said cylinder for engagement with said rotor, and release means encircling said axle with its respective peripheries fixed to said cylinder and said piston for relative movement thereof in release of said brake arrangement.

23. In a rotor brake arrangement for a railway car truck, a frame, a supporting wheel and axle assembly having a journal end, a journal box thereon, a rotor secured to said wheel, a piston fixed on said box and having a portion sleeved over said axle, a cylinder encircling said axle in slidable engagement with said piston, a stator supported about the outer periphery of said cylinder for engagement with said rotor, and release means vulcanized between said cylinder and said piston operative to cause relative movement thereof after actuation of said brakes.

24. In a rotor brake assembly, a fixed ring type piston having an annular flange, a movable ring type cylinder slidably mounted on said piston, and rubber means vulcanized between said piston and the inner periphery of said cylinder and operative to release said cylinder after actuation thereof.

CARL E. TACK.